2,846,491

REACTIONS OF SODIUM ACETYLIDE WITH ALKYL HALIDES

Thomas F. Rutledge, Madison, N. J., assignor to Air Reduction Company, Incorporated, New York, N. Y., a corporation of New York No Drawing. Application December 13, 1955
Serial No. 552,712

7 Claims. (Cl. 260—678)

This invention relates to improvements in the method of effecting the reaction of sodium acetylide with alkyl halides, and more specifically to an efficient method of reacting sodium acetylide with alkyl halides in certain organic diluents or reaction media.

The conventional methods of reacting sodium acetylide and an alkyl halide in liquid ammonia have been extensively reviewed by Nieuwland and Vogt (The Chemistry of Acetylene, 1945, pages 74–80) and by Vaughn et al. (J. Org. Chem., 2, 1–22, 1937–8). These methods, however, have objectionable features which are well known in the art and which are due largely to the presence of ammonia. Liquid ammonia is difficult to handle; it forms undesirable by-products; and in reactions utilizing alkyl halides with relatively large carbon chain lengths, the ammonia is necessarily subjected to elevated temperatures and superatmospheric pressures, thus creating reaction conditions which are admittedly hazardous. When the liquid ammonia is diluted with organic liquids such as diethyl ether, dichlorodiethyl ether, and ethylene diamine, yields of 1-alkynes are greatly reduced.

The reaction of alkyl halides with sodium acetylide has also been studied to some extent using the conventional organic diluents as reaction media, e. g., xylene, n-butyl ether, and dioxane. But in such instances, the alkyl halides have failed to react wtih sodium acetylide.

One object of this invention is to provide an improved method of reacting sodium acetylide with alkyl halides; another object is to effect the reaction of sodium acetylide with alkyl halides in a selective reaction medium at favorable temperatures and pressures; and a further object is to provide a rapid and efficient reaction for producing 1-alkynes.

In accordance with the invention, an alkyl halide is reacted with a dispersion of finely divided sodium acetylide, advantageously consisting mostly of particles less than 25 microns in diameter, in a selective organic liquid which is substantially inert with respect to the reactants and products of reaction, under controlled temperature conditions, to produce the desired alkyne. In a preferred and especially advantageous embodiment of the invention, the sodium acetylide is prepared according to the process of the copending application of Thomas F. Rutledge and Alio J. Buselli, Serial No. 391,139, filed November 9, 1953, and now Patent No. 2,777,884, Process For Producing Sodium Acetylide and Improved Sodium Acetylide Product. The sodium acetylide prepared by the process of the Rutledge et al. application can be at least 95% pure, containing less than around 1% of either or both sodium hydroxide and sodium carbonate, and is characterized principally by being a virtually white, free flowing powder, mainly less than 5 microns in diameter, which can be wetted by inert liquids without undesirable coalescence of the particles. Other characteristics include high thermal and storage stabilities. For example, the sodium acetylide may be exposed to the atmosphere without spontaneous ignition, and it may be stored for relatively long periods in dry air or inert gases such as argon or nitrogen.

I have found that certain organic liquid media have a very specific action in promoting the reaction of sodium acetylide with alkyl halides to form the desired alkynes. These diluents are N,N-dimethyl formamide, hexamethyl phosphoramide (tris-N,N-dimethyl phosphorous triamide), and N,N-dimethyl acetamide. While the action of these organic diluents is definite, the exact manner in which they serve is not clearly understood. It may be that their action is catalytic; that some physical factors are involved, such as solubility; or that the diluents take part in the reaction in some manner. In any event it is believed that a medium of high dielectric constant is preferred since many reactions of sodium acetylide, such as alkylation via alkyl bromides, are generally regarded as being of ionic nature.

The three diluents of this invention have high dielectric constants, and are relatively inert with respect to sodium acetylide, the alkyl halides, and the reaction products. They have boiling points above the reaction temperatures of the novel process. While all three diluents have been used satisfactorily in the practice of the invention, dimethyl formamide is the most effective. Being a member of the series of N-alkyl amides, dimethyl formamide is a highly polar material having a dielectric constant of 26.6 (at 25° C. and 250 kc.). This is a desirable characteristic of the diluent, since the sodium acetylide reaction of this invention is regarded as being ionic in nature. Further, dimethyl formamide is relatively stable up to its atmospheric boiling point (153° C.); and above 350° C., degradation may occur to dimethylamine and carbon dioxide. It has an ignition temperature of 445° C. Fortunately it is now commercially available at a reasonable price. Since dimethyl formamide is the most effective diluent, readily available, and the least expensive, the majority of the reactions were carried out in a medium comprising dimethyl formamide.

When reacting the improved sodium acetylide with an alkyl halide in the reaction media of this invention, excellent yields of alkynes are obtained according to the reaction:

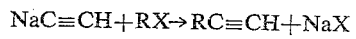

$$NaC{\equiv}CH + RX \rightarrow RC{\equiv}CH + NaX$$

wherein R is an alkyl and X is a halide, and the alkyl halide reacts with the sodium acetylide dispersed in the reaction medium to form the desired 1-alkyne and sodium halide.

Briefly, sodium acetylide is prepared according to the process of said copending application by adding a dispersion of sodium in a liquid such as di-n-butyl ether in a reactor equipped with a thermometer, heater, stirrer and acetylene inlet. Dry, purified acetylene is bubbled into the dispersion at a temperature of from 100° C. to 110° C. After the evolution of hydrogen has stopped, the reaction resulting in the production of sodium acetylide has been completed. The sodium acetylide is dispersed in the di-n-butyl ether in a fine state of sub-division, around 5 microns or less in diameter. The sodium acetylide thus prepared can be separated from the reaction medium by some conventional means (such as filtration or centrifugation) and substantially dried, for example, by vacuum drying. The filtered and dried sodium acetylide can be stored or transported, if desired. It can then be dispersed in a reaction medium of this invention, such as N,N-dimethyl formamide, for subsequent reaction with an alkyl halide such as n-butyl bromide.

In carrying out a process of the invention, an alkyl halide is added to the suspension of sodium acetylide in one of the above-mentioned selective liquid media at a temperature of 25° C. to 50° C. and at such a rate as to maintain an easily controlled reaction. After the desired reaction time, usually five to eight hours, the resulting mixture is filtered (suction) into a chilled receiver. A Dry Ice trap on the suction flasks avoids loss of the alkyne. The filtrate is fractionated to isolate the 1-alkyne and any unreacted alkyl halide. The reaction environment must be substantially free from moisture to prevent decomposition of the reactants.

The following typical examples will serve only to illustrate the invention more fully, and accordingly they are not to be construed as limiting the scope of the invention:

EXAMPLES 1–5

A dispersion of sodium in xylene, corresponding to 0.25 mole of sodium metal, was added to 300 ml. of xylene in a glass reactor which was equipped with a stirrer, condenser, thermometer, acetylene inlet tube, and an electric heating mantle. The xylene was of a commercial grade which had been freed of water and low boiling material by distillation. The mixture was heated to 100° C. while stirring. Dried purified acetylene gas was bubbled into the dispersion at about 100° C. After about two hours, no further evolution of hydrogen was recorded by a hydrogen analyzer in the exit gas stream. The flow of acetylene was discontinued, and the mix allowed to cool to room temperature. The sodium acetylide was separated from the reaction medium (xylene) by filtration and substantially dried by vacuum drying. The filtered and dried sodium acetylide was re-suspended in 400 ml. reaction medium in a one liter flask equipped with a stirrer, dropping funnel, and watercooled reflux condenser. The size of sodium particle was less than 5 microns in diameter. The mixture was heated from about 25° to 50° C., and n-butyl bromide was added over a period of 20 minutes. For simplicity, the details as to amounts of reactants, total volumes of diluents or reaction media, volume percentages of dimethyl formamide, the times of reaction, reaction temperatures, and yields of 1-hexyne in mole percentages based on n-butyl bromide are tabulated below.

Table I

| Examples | 1 | 2 | 3 | 4 | 5 |
|---|---|---|---|---|---|
| Reactants: | | | | | |
|   Sodium Acetylide, moles | 0.25 | 0.25 | 1.00 | 0.25 | 0.25. |
|   n-butyl bromide, moles | 0.25 | 0.25 | 1.25 | 0.25 | 0.25. |
| Diluents: | | | | | |
|   Total volume, ml | 200 | 380 | 480 | 395 | 360. |
|   Secondary | none | xylene | xylene | xylene | butyl ether. |
|   Primary | DMF[1] | DMF | DMF | DMF | DMF. |
|   Volume percent | 100 | 35 | 37.5 | 44 | 50. |
| Reaction conditions: | | | | | |
|   Time, hours | 5½ | 5[2] | 8 | 5[2] | 5[2]. |
|   Temperature, ° C | 23–30 | 25–30 | 25–35 | 45–50 | 25–30. |
| Yield of 1-hexyne: Mole percent | 59 | 67 | 81 | 75 | 71. |

[1] Dimethyl formamide.
[2] Sodium acetylide-xylene-DMF slurry stirred for about one hour before the halide addition.

The data above reveals the remarkable activity and usefulness of an organic medium comprising dimethyl formamide in promoting the reaction of sodium acetylide with n-butyl bromide. Conducting the process at atmospheric pressures and normal temperatures, commercially satisfactory yields of 1-hexyne are obtained in relatively short periods (5 to 8 hours). In all the examples, total 1-hexyne was confirmed by standard iodomercurate analysis. It is noted that solvent mixtures of dimethyl formamide and xylene or butyl ether are more effective than a solvent comprising dimethyl formamide alone. The synergistic activity between the components of such mixtures undoubtedly contributes to their usefulness as reaction media. Optimum concentrations of dimethyl formamide in ether xylene or butyl ether are about 35 to 50% by volume, for reactions at about 25 to 50° C. Further, butyl ether-DMF mixtures and xylene-DMF mixtures were examined under identical conditions, and the results were similar when such mixtures were used in the process of this invention.

Loading of diluent, i. e., volume of organic medium per mole of sodium acetylide, represents another aspect of the novel process. Several experiments were conducted at about 15 to 35° C., using a DMF concentration of 37.5 volume percent in xylene and a 25 percent excess of butyl bromide. Under these conditions, optimum yield was obtained at a loading of about 2 moles of sodium acetylide per liter of mixed diluent. Conversion and yield were 81 mole percent.

EXAMPLE 6

In a manner similar to that described for Examples 1 to 5, finely divided sodium acetylide was shown to react readily with an alkyl halide having a relatively large carbon chain length, n-octadecyl bromide. The reaction medium was a DMF concentration of 33 volume percent in xylene; the molar ratio of sodium acetylide to n-octadecyl bromide was 1:1; and the reaction temperature ranged from 25 to 30° C. The yield of 1-eicosyne was 90% based on n-octadecyl bromide. These results indicate that the yield of 1-alkyne prepared in accordance with the invention increases as the carbon chain length of the alkyl group increases.

The other two diluents of the invention, dimethyl acetamide and hexamethyl phosphorous triamide, were found to be satisfactory as liquid media for the reaction of finely divided sodium acetylide with an alkyl halide, such as n-butyl bromide. The yields of 1-alkynes, however, were not as high as those obtained when using dimethyl formamide as the reaction medium.

It is to be understood that this invention includes not only the three effective organic diluents as defined and illustrated above, but also mixtures of these diluents with other conventional organic reaction media. In general, the other diluents must be relatively inert with respect to sodium acetylide, the alkyl halides, and the products of reaction; and such diluents must have boiling points above the reaction temperature used in the process of this invention. Representative liquid media include aromatic hydrocarbons (xylene), dialkyl ethers (di-n-hexyl carbitol), and alkyl ethers of glycols or polyglycols (di-n-butyl carbitol).

The invention is not limited to the specific embodiments described herein, but may be practiced in other ways without departing from the spirit and scope of the invention is defined by the following claims.

I claim:

1. A process for producing a 1-alkyne by effecting the reaction of sodium acetylide with an alkyl halide which comprises reacting an alkyl halide and finely divided sodium acetylide dispersed in an organic liquid medium having a high dielectric constant and being substantially inert with respect to the reactants and products of reactants, said medium being selected from the group consisting of N,N-dimethyl formamide, N,N-dimethyl acetamide, tris-N,N-dimethyl phosphorous triamide, and mixtures thereof, conducting the reaction at a temperature of from 15° to 50° C., and separating the 1-alkyne formed from the reacting materials.

2. A process for producing a 1-alkyne in accordance with claim 1 wherein the organic liquid medium comprises an amount of tris-N,N-dimethyl phosphorous triamide sufficient to promote the reaction.

3. A process for producing a 1-alkyne in accordance with claim 1 wherein the organic liquid medium comprises an amount of N,N-dimethyl acetamide sufficient to promote the reaction.

4. A process for producing a 1-alkyne in accordance with claim 1 wherein the dispersed sodium acetylide particles are preponderantly less than 25 microns in diameter, and the reaction is carried out in the substantial absence of any substances which interfere with said reaction.

5. A process for producing a 1-alkyne in accordance with claim 1 wherein the organic liquid medium comprises an amount of N,N-dimethyl formamide sufficient to promote the reaction, and the reaction environment is substantially free of any moisture whereby decomposition of the reactants is prevented.

6. A process for producing a 1-alkyne in accordance with claim 5 in which the ratio of sodium acetylide to said organic liquid medium is about 2 moles of sodium acetylide per 1 liter of reaction medium.

7. A process for producing a 1-alkyne in accordance with claim 5 in which said amount of N,N-dimethyl formamide is about 30 to 50 percent by volume of said organic liquid medium.

References Cited in the file of this patent

UNITED STATES PATENTS

| | | |
|---|---|---|
| 2,146,448 | Scott et al. | Feb. 7, 1939 |
| 2,198,236 | Vaughn | Apr. 23, 1940 |
| 2,724,008 | Lyon et al. | Nov. 15, 1955 |

OTHER REFERENCES

Breed and Hennion: Jour. Am. Chem. Soc., vol. 59, pages 1310–11 (1937). (Abstracted in Chem. Abstracts, vol. 31 (1937), p. 5753).

Bergmann: "The Chemistry of Acetylene and Related Compounds," pages 32 and 33; published by Interscience Publishers, Inc., New York, N. Y. (1948.)

Adams et al.: "Organic Reactions," vol. V, pages 25–29, pub. by John Wiley & Sons, Inc., New York. N. Y., 1949.